US007544105B2

(12) United States Patent
Stagi et al.

(10) Patent No.: US 7,544,105 B2
(45) Date of Patent: Jun. 9, 2009

(54) CABLE AND CABLE CONNECTION ASSEMBLY

(75) Inventors: William R. Stagi, Burien, WA (US); Jorge Albe, Tacoma, WA (US); James Steele, Seattle, WA (US)

(73) Assignee: UTILX Corporation, Kent, WA (US)

( * ) Notice: Subject to any disclaimer, the term of this patent is extended or adjusted under 35 U.S.C. 154(b) by 0 days.

(21) Appl. No.: 11/210,149

(22) Filed: Aug. 23, 2005

(65) Prior Publication Data

US 2007/0054563 A1 Mar. 8, 2007

(51) Int. Cl.
*H01R 11/09* (2006.01)
(52) U.S. Cl. .................... 439/784; 439/583; 439/805; 174/74 R
(58) Field of Classification Search ............. 439/775, 439/784, 790–791, 794, 796–797, 199, 804, 439/779, 805, 274, 454, 204, 583, 427; 174/93, 174/74 R, 15.6
See application file for complete search history.

(56) References Cited

U.S. PATENT DOCUMENTS

| | | | | |
|---|---|---|---|---|
| 1,646,660 A | * | 10/1927 | Prince | ............ 439/805 |
| 1,965,540 A | * | 7/1934 | Atkinson | ............ 156/48 |
| 2,087,384 A | * | 7/1937 | Lee | ............ 174/72 R |
| 2,187,007 A | * | 1/1940 | Barnes | ............ 166/241.5 |
| 2,209,620 A | * | 7/1940 | Berndt et al. | ............ 439/820 |
| 2,279,508 A | * | 4/1942 | Bergan | ............ 439/805 |
| 2,463,144 A | * | 3/1949 | Buchanan | ............ 439/805 |
| 2,825,039 A | | 2/1958 | Schurman | |
| 3,444,507 A | | 5/1969 | Gerhard | |
| 3,508,188 A | | 4/1970 | Buck | |
| 3,633,155 A | | 1/1972 | Taylor | |
| 3,845,450 A | | 10/1974 | Cole | |
| 4,003,620 A | | 1/1977 | O'Brien | |
| 4,192,569 A | | 3/1980 | Mucci | |
| 4,696,540 A | | 9/1987 | Adams | |
| 4,752,252 A | * | 6/1988 | Cherry et al. | ............ 439/784 |
| 4,927,386 A | | 5/1990 | Neuroth | |
| 5,018,987 A | * | 5/1991 | Kirma | ............ 439/445 |
| 5,035,660 A | * | 7/1991 | Werner | ............ 439/796 |
| 5,051,103 A | | 9/1991 | Neuroth | |
| 5,440,073 A | * | 8/1995 | Lin et al. | ............ 174/74 R |
| 5,478,970 A | * | 12/1995 | Lawler et al. | ............ 174/74 R |
| 5,573,423 A | * | 11/1996 | Lin et al. | ............ 439/462 |
| 5,645,438 A | | 7/1997 | Cairns | |
| 5,722,842 A | | 3/1998 | Cairns | |
| 5,738,535 A | | 4/1998 | Cairns | |
| 5,907,128 A | | 5/1999 | Lanan | |
| 5,934,937 A | * | 8/1999 | McCarthy | ............ 439/583 |

(Continued)

FOREIGN PATENT DOCUMENTS

GB 2060278 * 9/1980

*Primary Examiner*—Michael C Zarroli
(74) *Attorney, Agent, or Firm*—Christensen O'Connor Johnson Kindness PLLC

(57) ABSTRACT

A cable connection assembly (100, 200, or 300) for coupling a cable (102, 104, 204, 302, or 304) to an apparatus (106, 206, or 306). The cable connection assembly includes a collar (108, 110, 210, 308, or 310) adapted to sealingly engage the apparatus, the collar having a fastener (144) for coupling the collar to the cable by rotating the collar into locking engagement with at least a portion of the cable.

31 Claims, 6 Drawing Sheets

U.S. PATENT DOCUMENTS

| | | | |
|---|---|---|---|
| 6,109,946 A * | 8/2000 | Hotz et al. ................. 439/322 |
| 6,227,866 B1 | 5/2001 | Williams |
| 6,332,787 B1 | 12/2001 | Barlow |
| 6,364,677 B1 | 4/2002 | Nysveen |
| 6,736,545 B2 | 5/2004 | Cairns |
| 6,848,934 B1 * | 2/2005 | McCarthy ................. 439/427 |
| 7,014,513 B2 * | 3/2006 | Tomasino ................. 439/784 |
| 7,195,504 B2 | 3/2007 | Bertini |
| 2005/0189130 A1 | 9/2005 | Bertini |

* cited by examiner

CABLE AND CABLE CONNECTION ASSEMBLY

FIELD OF THE INVENTION

The illustrated embodiments of the present invention relate generally to cable connection assemblies, and more specifically, to cable connection assemblies for connecting a first length of cable to an apparatus, such as a second length of cable a dead end seal.

BACKGROUND OF THE INVENTION

Often, a need arises to splice a first length of cable to a second length of cable of a cable assembly. Cable connection assemblies have been developed to meet this need. For instance, referring to FIG. 1, one previously developed cable connection assembly 10 for connecting a first length of cable 11 to a second length of cable 13 of a cable assembly is shown. The cable connection assembly 10 includes a crimp connector 16 which is crimped to couple a first conductor 12 of the first cable 11 to a second conductor 14 of the second cable 13. The first and second conductors 12 and 14 each pass coaxially through an insulative conduit 18 and 20 of the first and second cables 11 and 13. The insulative conduits 18 and 20 each slidingly pass through a connection collar 22 and 24, respectively. The connection collars 22 and 24 include threaded portions 26 and 28. The threaded portions 26 and 28 are adapted to interface with a pair of threaded portions 30 and 32 disposed on a sleeve 34 which is a hollow, cylindrical member machined so as to have a variable wall thickness and the threaded portions 30 and 32.

The cable connection assembly 10 also includes a pair of seal assemblies 36 and 38. Each seal assembly 36 and 38 includes a pair of annular shaped washers 40 and a compression seal 42. As the pair of washers 40 are pressed toward one another, the compression seal 42 disposed between the washers 40 expands outward to sealingly engage the sleeve 34 and inward to sealingly engage the outer surface of the insulative conduit 18 and 20. To force the pair of washers 40 toward one another, each of the collars 22 and 24 include a shoulder 44 and each end of the sleeve 34 includes a shoulder 46. As the collars 22 and 24 are threaded onto the sleeve 34, the opposing shoulders 44 and 46 force the washers 40 towards one another, forcing the compression seal 42 in sealing relationship with the sleeve 34 and the insulative conduits 18 and 20. Of note, although not shown, the connection assembly 10 may be wrapped/encased with an insulation layer as is well known to those skilled in the art.

Although this cable connection assembly 10 is effective, it is not without its problems. For instance, each cable connection assembly 10 must be custom designed for each cable to be spliced. Moreover, for the seal assemblies 36 and 38 to properly seal against the outer surfaces of the insulative conduits 18 and 20, the exact diameter of the insulative conduits 18 and 20 must be known so that the parts of the cable connection assembly 10 can be designed accordingly such that the seal assemblies 36 and 38 are able to seal properly against the insulative conduits 18 and 20 and the sleeve 34.

The custom designing of the cable connection assembly 10 for each application increases the cost of the cable connection assembly 10 and causes a delay in how fast a proper cable connection assembly 10 can be provided to the end user. Further, the cable connection assembly 10 is difficult to assemble due in part to the large number of parts, the inability of the sleeve 34 to slide over the collars 22 and 24, the fact that the collars 22 and 24 have to be threaded into the sleeve 34, and due to the fact that the proper amount of compression must be applied to the compression seals 42 for them to seal properly.

Thus, there exists a need for an improved cable connection assembly that is inexpensive to manufacture, reliable, easy to assemble, seals well, and/or which can be used with a wider range of conductor and/or insulation diameters.

SUMMARY OF THE INVENTION

One embodiment of a cable connection assembly formed in accordance with the present invention for coupling a cable to an apparatus is disclosed. The cable connection assembly includes a collar adapted to sealingly engage the apparatus, the collar having a fastener for coupling the collar to the cable by rotating the collar into locking engagement with at least a portion of the cable.

Another embodiment of a cable connection assembly for a cable is disclosed. The cable connection assembly includes a collar having a collar fastener, wherein the collar fastener is adapted to couple to the cable by rotation of the collar fastener relative to the cable. The cable connection assembly also includes a sleeve adapted to sealingly engage the collar, thereby defining a cavity in which an end of the cable is adapted to be at least partially disposed within.

Still another embodiment of a cable connection assembly formed in accordance with the present invention is disclosed. The cable connection assembly may be used for coupling a first conductor for carrying electrical current to a second conductor for carrying electrical current, the first conductor being insulated by a first insulative conduit having a first conduit fastener, the second conductor being insulated by a second insulative conduit having a second conduit fastener.

The cable connection assembly includes a first collar having an outer surface, an inner surface defining a passageway passing axially through the first collar for permitting the first conductor to pass therethrough, a first collar fastener adapted to couple to the first conduit fastener by rotation of the first collar fastener relative to the first conduit fastener, and a seal disposed on the outer surface.

The cable connection assembly also includes a second collar having an outer surface, an inner surface defining a passageway passing axially through the second collar for permitting the second conductor to pass therethrough, a second collar fastener adapted to couple to the second conduit fastener by rotation of the second collar fastener relative to the second conduit fastener, and a seal disposed on the outer surface. The cable connection assembly further includes a sleeve having a passageway passing therethrough, the passageway adapted to at least partially receive the first and second conductors, the sleeve adapted to sealingly engage the seal disposed on the outer surface of the first collar and the seal disposed on the outer surface of the second collar.

One embodiment of a method performed in accordance with the present invention for coupling a cable to an apparatus is disclosed. The method includes rotating a collar such that a fastener of the collar lockingly engages the cable and sealingly coupling the apparatus to the collar.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
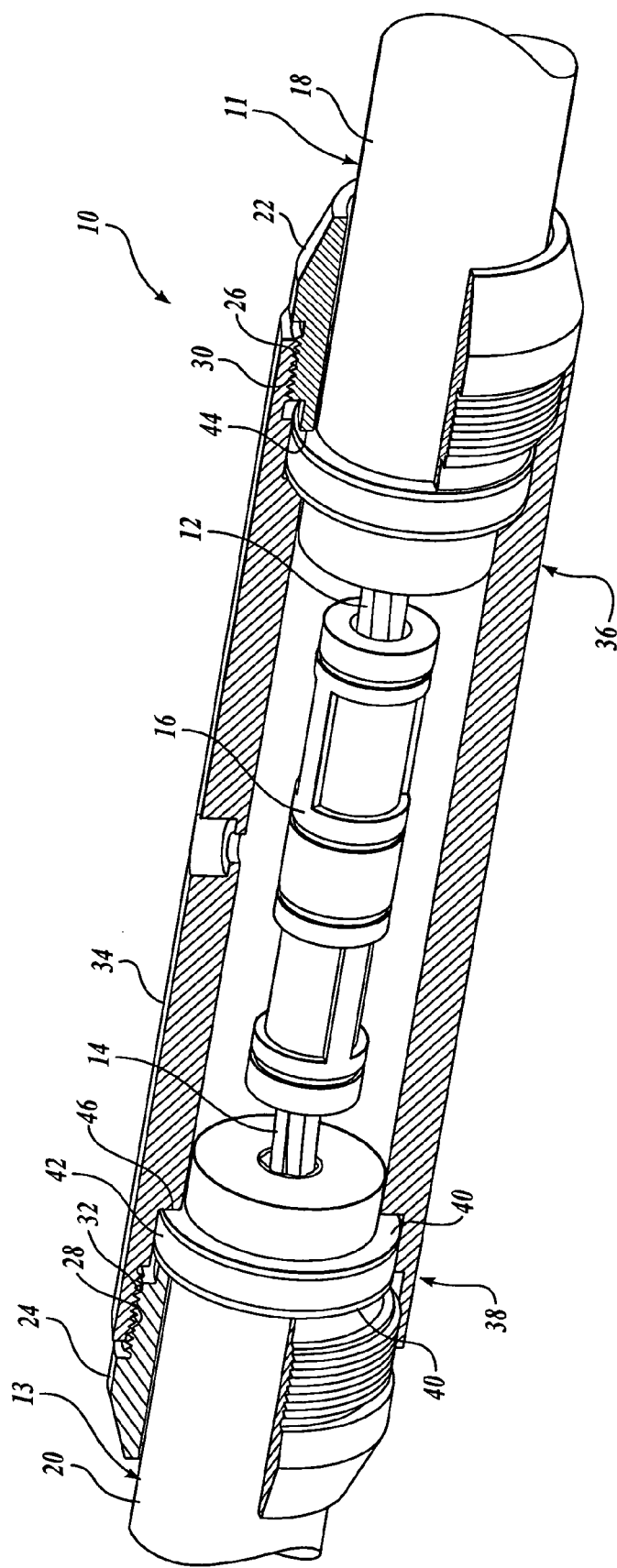
FIG. 1 is a partial cross-sectional view of a previously developed cable connection assembly for coupling a first length of cable to a second length of cable of a cable assembly.
Figure 2:
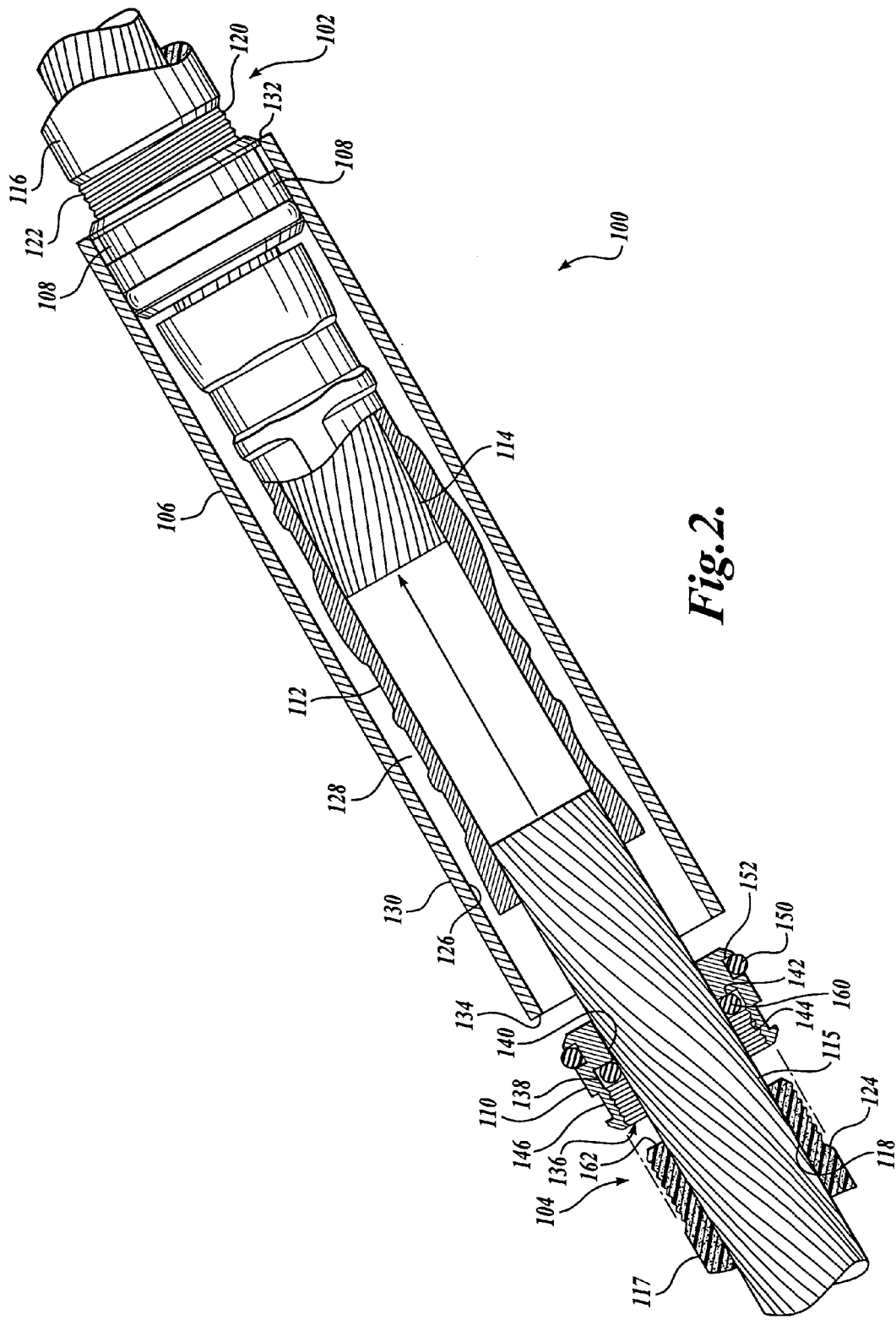
FIG. 2 is a partial cross-sectional and exploded elevational view of one embodiment of a cable connection assembly formed in accordance with the present invention for coupling a first length of cable to a second length of cable of a cable assembly.
Figure 3:
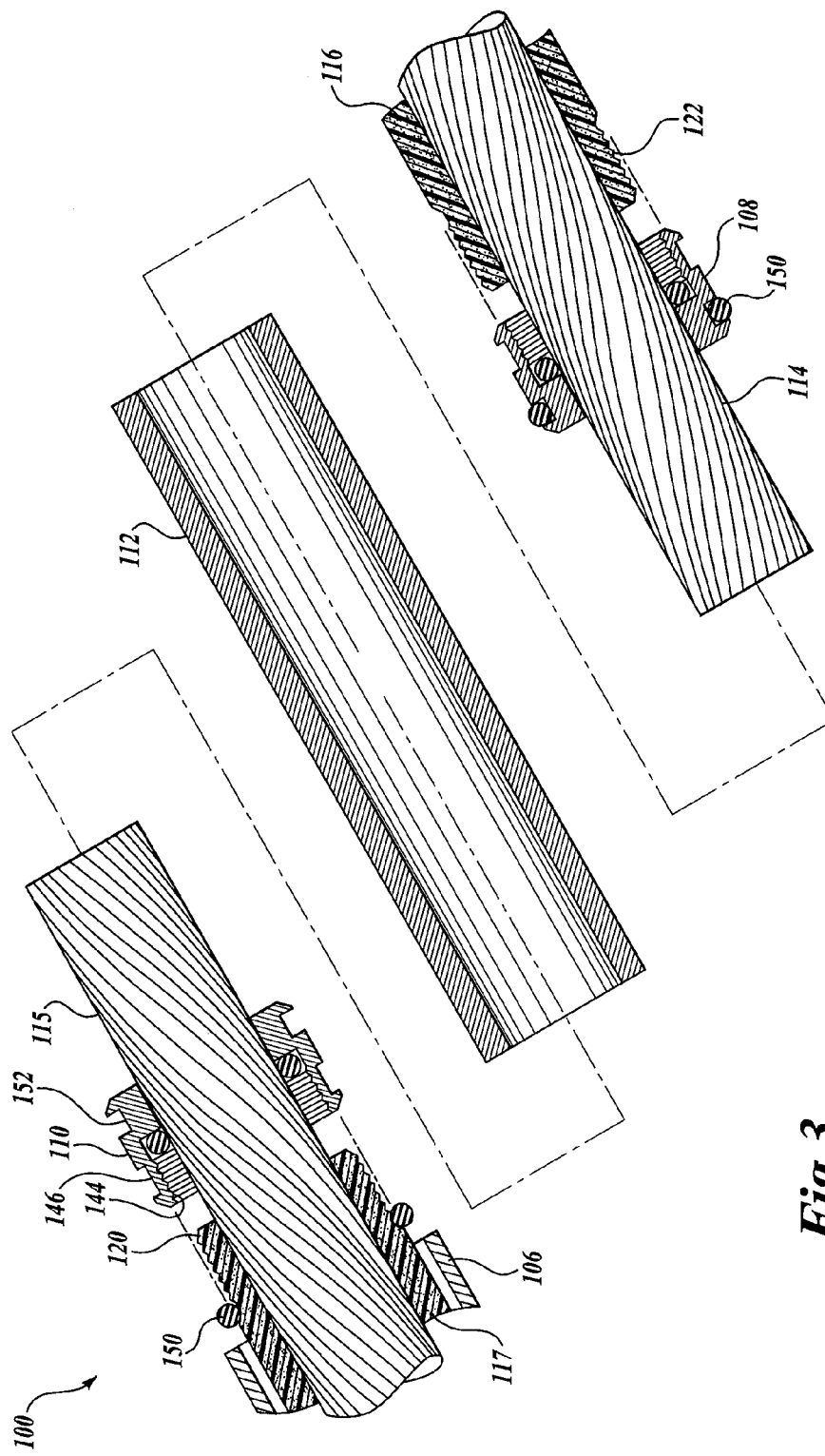
FIG. 3 is a partial cross-sectional view of the cable and cable connection assembly of FIG. 2 prior to assembly.
Figure 4:
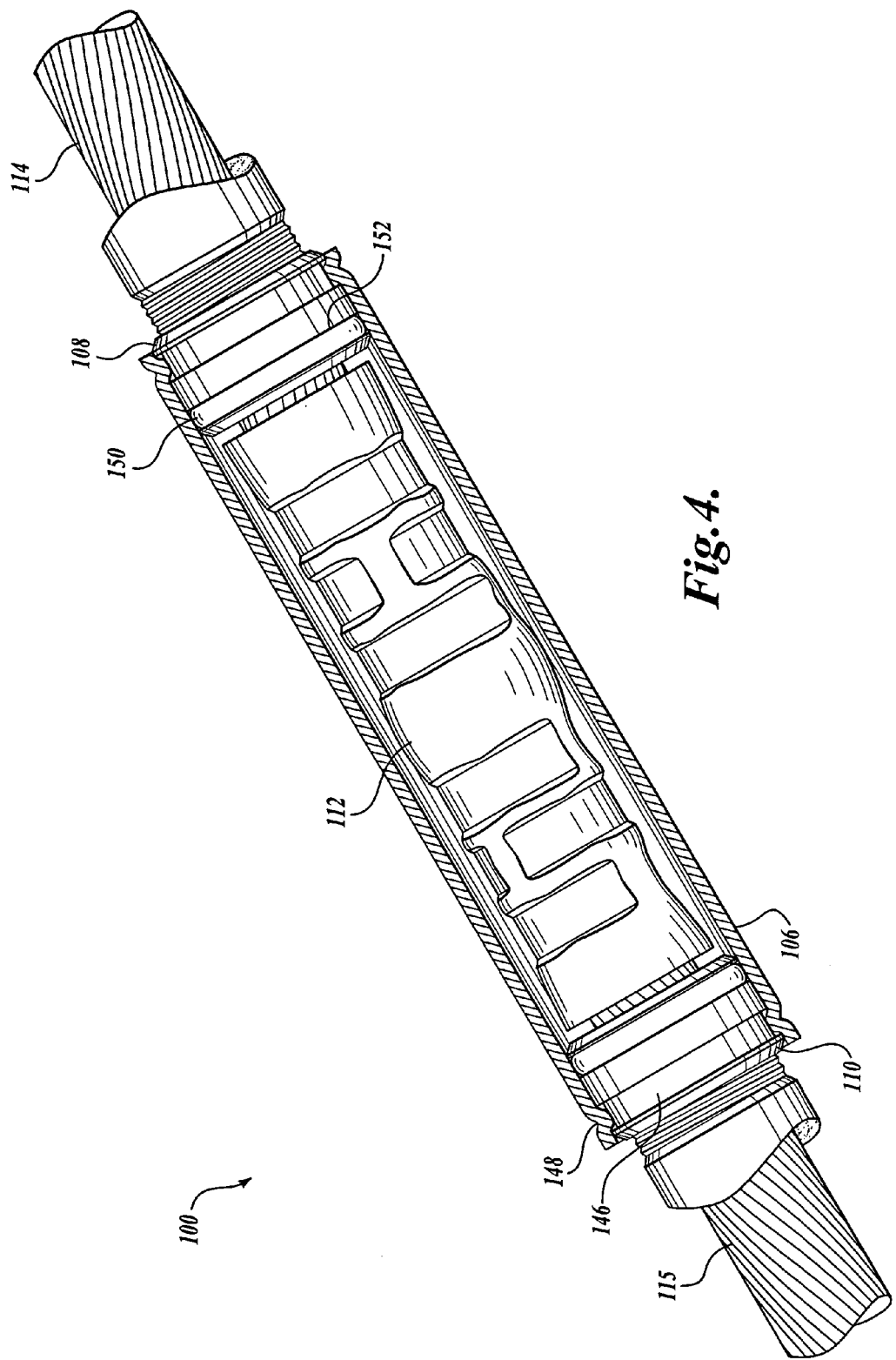
FIG. 4 is a partial cross-sectional, assembled, elevational view of the cable and cable connection assembly of FIG. 2.

Referring to FIGS. 2-4, one embodiment of a cable connection assembly 100 formed in accordance with the present invention is shown. The cable connection assembly 100 may be used to couple a first cable 102 to a second cable 104 of a cable assembly. The cable connection assembly 100 may include a sleeve 106, a first collar 108, a second collar 110, and a cable connector 112. These components work together to enable a user to splice the first cable 102 to the second cable 104 as shown in FIG. 4.

Turning to FIG. 2, the first and second cables 102 and 104 of the cable assembly are substantially identical to one another and each include a conductor 114 and 115 for carrying a current and an insulative conduit 116 and 117 for insulating the conductor 114 and 115. In the illustrative embodiment, the conductors 114 and 115 are helically wound, multi-strand wires, although it should be apparent to those skilled in the art that the conductors 114 and 115 may be of any suitable material and design able to efficiently carry a current, a few suitable examples being aluminum or copper based solid core or multi strand wires.

The insulative conduits 116 and 117 may be tubular shaped so as to have a passageway 118 passing coaxially through the insulative conduit 116 or 117, the passageway 118 sized and shaped to receive the conductor 114 or 115. The insulative conduits 116 and 117 may each include a reduced diameter portion 120 having a diameter that is less than a normal diameter of the rest of the insulative conduit 116 and 117. Disposed on the reduced diameter portion is a conduit fastener, which in the illustrated embodiment, is in the form of a set of external threads 122. A shoulder 124 is formed as the diameter of the insulative conduit 116 and 117 transitions from the normal diameter of the insulative conduit 116 and 117 to the reduced diameter portion 120. The insulative conduit 116 and 117 may be formed from any suitable insulative material hereto known or to be developed, a few suitable examples being high molecular weight polyethylene (HM-WPE) and cross-linked polyethylene (XLPE).

The sleeve 106 may be an elongate hollow, tubular apparatus having an inner surface 126 defining an internal cavity 128 and an outer surface 130 spaced from the inner surface 126 by a thickness of a wall of the sleeve 106. The ends 132 and 134 of the sleeve 106 are open. The sleeve 106 is adapted to receive the free ends of the first and second conductors 114 and 115 within the internal cavity 128 of the sleeve 106 through the open ends 132 and 134 of the sleeve 106. The sleeve 106 may be made from a seamless pipe, and in one working embodiment, is made from seamless aluminum pipe able to withstand high pressures, such as above about 50 psi, or even higher pressures, such as above 70 psi, 90 psi, or 100 psi.

In one embodiment, the sleeve 106 is made from a pipe having a pipe wall of a substantially constant thickness and diameter with smooth inner and outer surfaces 126 and 130. Inasmuch as the sleeve 106 of this working embodiment may be formed from standard pipe which does not require further machining, such as to form threads, recesses, or variable wall thicknesses or diameters, the sleeve 106 may be easily manufactured at a low cost. Although the illustrated embodiment depicts the sleeve as being formed from a smooth wall pipe, it should be apparent that the sleeve 106 may alternately be other than round, have a varying wall thickness or diameter, recesses, threads, channels, etc., without departing from the spirit and scope of the present invention.

Focusing now on the collars 108 and 110, the collars 108 and 110 are substantially identical to one another. Therefore, for the sake of brevity, only one of the collars will be described in detail herein, those skilled in the art appreciating that the description of one of the collars applies equally well to the other collar. The collar 110 is annular in shape and includes a passageway 136 passing coaxially through the collar 110. The passageway 136 is sized and configured to permit the conductor 115 to pass therethrough.

The passageway 136 includes an enlarged diameter section 138 and a reduced diameter section 140, thereby forming a shoulder 142 as the inner surface of the passageway 136 transitions from the enlarged diameter to the reduced diameter. Disposed on the enlarged diameter section 138 is a collar fastener, which in the illustrated embodiment is in the form of a set of internal threads 144. The internal threads 144 are sized and shaped to sealingly engage the external threads 122 of the insulative conduit 117.

Disposed on the outer surface of the collar 110 is a recess 146. Turning to FIG. 4, the recess 146 is an annular channel disposed circumferentially about the collar 110. The recess 146 is able to receive a deformed portion 148 of the sleeve 106 to aid in coupling of the sleeve 106 to the collar 110. For instance, the sleeve 106 may be crimped at the location of the recess 146 to cause the sleeve 106 to deform into the recess 146.

Although a recess 146 is shown, it is noted that the recess 146 may be removed from the collar 110 without departing from the spirit and scope of the present invention. Further, although a recess 146 is shown and described for coupling the sleeve 106 to the collar 110, it should be apparent to those skilled in the art that the sleeve 106, if desired to be mechanically coupled to the collar 110, may be coupled to the collar 110 in any number of ways other than deforming the sleeve 106 into the recess 146, a few suitable examples being adhesives, welding, and mechanical fasteners, such as set screws.

Returning to FIG. 2, the outer surface of the collar 110 includes a seal 150. The seal 150 is sized and shaped to sealingly engage both the collar 110 and the sleeve 106 to provide a pressure seal between the collar 110 and the sleeve 106. Thus, the sleeve 106 forms a pressure vessel able to contain a fluid under pressure within the sleeve 106. For instance, when a restorative compound is pumped into the cable 102, the sleeve 106 seals the first cable 102 to the second cable 104 while permitting restorative compound to pass between the cables and the sleeve 106 also assists in resisting moisture transfer from entering the conductor area.

In the illustrated embodiment, the seal 150 is an O-ring disposed within an annular channel 152 located circumferentially about the collar 110. Although the seal 150 is illustrated and described as being an O-ring disposed within a channel, it should be apparent that the seal may take other forms without departing from the scope of the present invention. For example, a gasket type seal or a liquid applied sealant used with or without a channel are within the scope of the present invention.

The cable connection assembly 100 includes a conduit end seal 160. The conduit end seal 160 is adapted to seal the collar 110 to the insulative conduit 117. For instance, the conduit end seal 160 is adapted to sealing engage an end surface 162 of the insulative conduit 117 and the shoulder 142 of the collar 110, thereby sealing the insulative conduit 117 to the collar 110. Thus, when a restorative compound or other fluid is injected along the length of the conductor 115, the fluid will flow through the collar 110 without leaking at the connection between collar 110 and the insulative conduit 117, should the threaded connection between the collar 110 and the insulative conduit 117 prove inadequate to seal the fluid therewithin.

Although the illustrated embodiment depicts the conduit end seal 160 as an O-ring, those skilled in the art will appreciate that the conduit end seal 160 may take many forms, including compression gaskets and/or liquid applied gaskets.

The cable connector 112 is used to both physically and electrically couple the two conductors 114 and 115. Specifically, the connector 112 is a crimp style connector, made of an electrically conductive material that is sufficiently malleable to permit the connector 112 to be crimped to couple the two conductors 114 and 115 together. The connector 112 permits current from one conductor 114 to pass to the other connector 115 and couple the two conductors 114 and 115 together to withstand a predetermined tensile force.

Although a crimp style connector 112 is illustrated and described, it should be apparent to those skilled in the art that other types of connectors 112 are within the scope of the present invention. A few suitable examples being connectors 112 which do not provide any substantial mechanical connection between the two conductors 114 and 115, a tube style connector utilizing set screws for coupling the connector to the conductors, etc. Of note, FIG. 3 shows the connector 112 prior to being crimped. FIGS. 2 and 4 show the connector 112 after crimping.

In light of the above description, the installation and use of the cable connection assembly 100 will now be described in greater detail. Referring to FIG. 3, in the area of the splice, the insulative conduits 116 and 117 are cut back a predetermined distance from the free ends of the conductors 114 and 115. The reduced diameter portion of the insulative conduits 116 and 117 is cut into the insulative conduits 116 and 117 and threaded so as to have external threads 122. The seal 150 is pushed over the reduced diameter portion 120 of the collar 110. The internal threads 144 of the collars 108 and 110 are screwed onto the external threads 122 of the insulative conduits 116 and 117 by rotation of the collars 108 and 110 relative to the insulative conduits 116 and 117. The sleeve 106 is then slid past one of the collars, such as collar 110. This is made easier since the seal 150 associated with collar 110 is disposed on the reduced diameter portion 120 of the insulative conduit 117 instead of upon the collar 110.

The free ends of the conductors 114 and 115 are then inserted within the cable connector 112 in an end to end relationship. The connector 112 is then crimped as is well known in the art to both electrically and mechanically couple the two conductors 114 and 115 to one another, also resulting in a fluid tight seal. The sleeve 106 is then slid back over the collar 110 and past the collar 110 such that the seal 150 can be placed in the channel 152 of collar 110. The sleeve 106 is then moved such that sleeve 106 sealingly engages the seal 150 associated with the first collar 108 and the seal 150 associated with the second collar 110, thereby forming a pressure vessel housing the connector 112.

The pressure vessel formed is able to withstand fluid pressures to impede a fluid, such as restorative compound, from leaking from the connection assembly 100, or a fluid, such as water, from entering the connection assembly 100. Preferably, the connection assembly is able to withstand fluid pressures of greater than 25 psi, or even higher pressures such as greater than 50 psi, 75 psi, or 100 psi. The sleeve 106 may then be deformed, such as by crimping, such that the deformed portions 148 (See FIG. 4) of the sleeve 106 enter the recess 146 in the collars 108 and 110, thereby mechanically coupling the sleeve 106 to the collars 108 and 110.

The first and second collars 108 and 110 are threaded to the insulative conduits 116 and 117, thereby creating an end seal between the end surface 162 and the shoulder 142. Further, because of the threaded engagement between the collars 108 and 110 and the insulative conduits 116 and 117, the resulting attachment is more secure than existing designs. Specifically, the seal between the end surface 162 and the shoulder 142 is maintained during dynamic changes, such as thermal changes, in the insulative conduits. Because the collars 108 and 110 are threadably connected to the insulative conduits 116 and 117, any changes or movement of the insulative conduits results in a corresponding movement of the collar. This maintains a secure end seal between the end surface 162 and the shoulder 142.

As is apparent to those skilled in the art based on the above description, the illustrated embodiment of the cable connection assembly 100 is able to be used with many different sizes of cables having varying conductor and insulative conduit diameters. Moreover, since the insulative conduits are cut after manufacture to form the reduced diameter portion 120 with the external threads 122, the outer diameter of the insulative conduit is relatively unimportant since the seal between the collar and the insulative conduit is formed at the reduced diameter portion 120 having a predetermined diameter formed when the reduced diameter portion is cut into the insulative conduit, and not on the outer surface of the conduit which can have a diameter that varies between different cables. Thus, for the illustrated embodiment of the cable connection assembly 100, the cable connection assembly 100 does not have to be custom designed based on the exact outer diameter of the insulative conduit.

Figure 5:
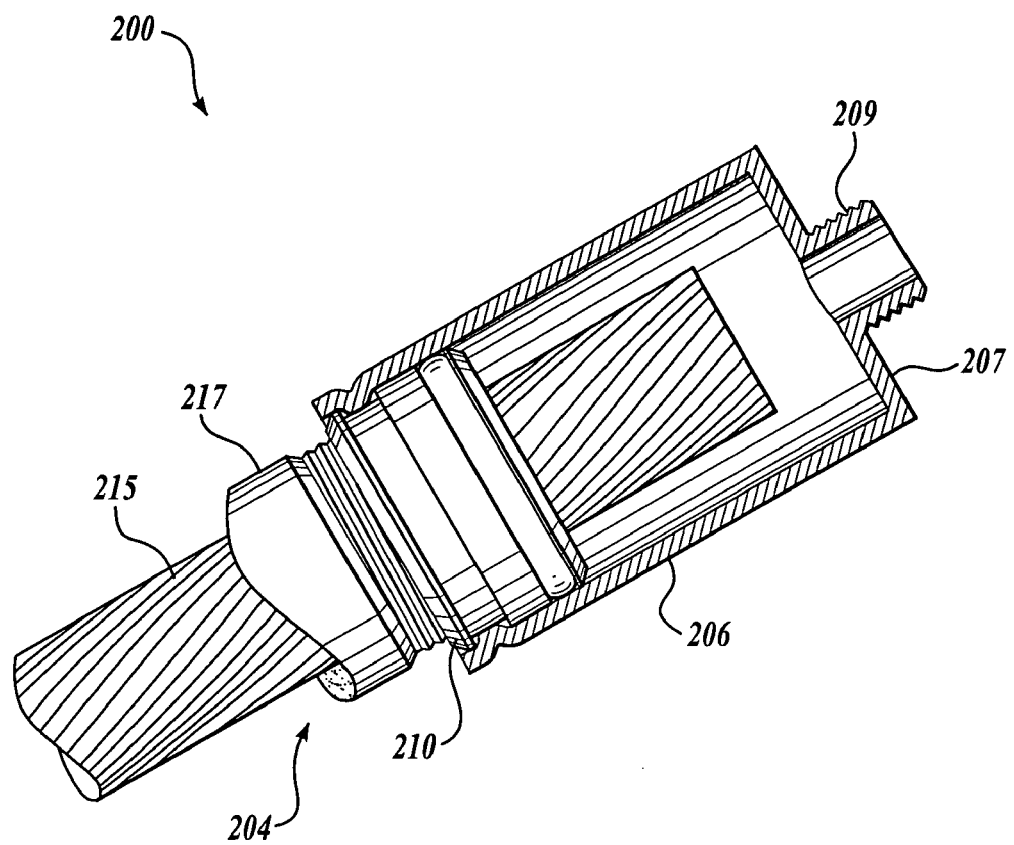
FIG. 5 is a partial cross-sectional, assembled, elevational view of an alternate embodiment of a cable connection assembly formed in accordance with the present invention for terminating an end of a cable.

Referring to FIG. 5, an alternate embodiment formed in accordance with the present invention of a cable connection assembly 200 for terminating an end of a cable 204 of a cable assembly is shown. The cable connection assembly 200 is substantially identical in construction and operation to the cable connection assembly 100 of FIGS. 2-4, therefore this detailed description will, for the sake of brevity, only describe the aspects of the cable connection assembly 200 which depart from the previously described embodiment.

The cable connection assembly 200 of FIG. 5 is used for terminating or dead ending a cable 204 of a cable assembly. The cable 204 is identical to the cable 104 of the previously described embodiment. Likewise, the collar 210 is identical to the collar 110 of the previously described embodiment. However, unlike the above the described embodiment, the sleeve 206 of the cable connection assembly 200 of FIG. 5 includes an end plate 207 for sealing off the distal end of the sleeve 206, the sleeve 206 thereby acting as a dead end seal. Additionally, the sleeve 206 may include a connector 209 for permitting a fluid to be pumped into the sleeve 206. For instance, a user may pump a restorative compound into the sleeve 206 for restoring the insulative properties of the insulative conduit 217. The sleeve 206 sealingly engages the collar 210 to form a pressure vessel, the pressure vessel able to impede fluids from exiting or entering the cable connection assembly 200.

Although FIG. 5 shows a sleeve in the form of a dead end seal having a particular shape and form, it should be apparent to those skilled in the art that the illustrated dead end seal is illustrative in nature only and is not limiting. Moreover, the dead end seal shown is merely one example of a dead end seal suitable for use with the present invention, and those skilled in the art will appreciate that the dead end seal may take many different shapes and forms other than those illustrated and described without departing from the spirit and scope of the present invention.

Although the illustrated embodiment depicts and describes the collar and conduit fasteners as being threaded fasteners able to couple to one another by rotation of the collar fastener relative to the conduit fastener, it should be apparent that other collar and conduit fasteners are suitable for use with the present invention, a few examples being quick connect fasteners and bayonet type fasteners, which may or may not require rotation of the collar and conduit fasteners relative to one another to couple to one another.

Figures 6, 7:
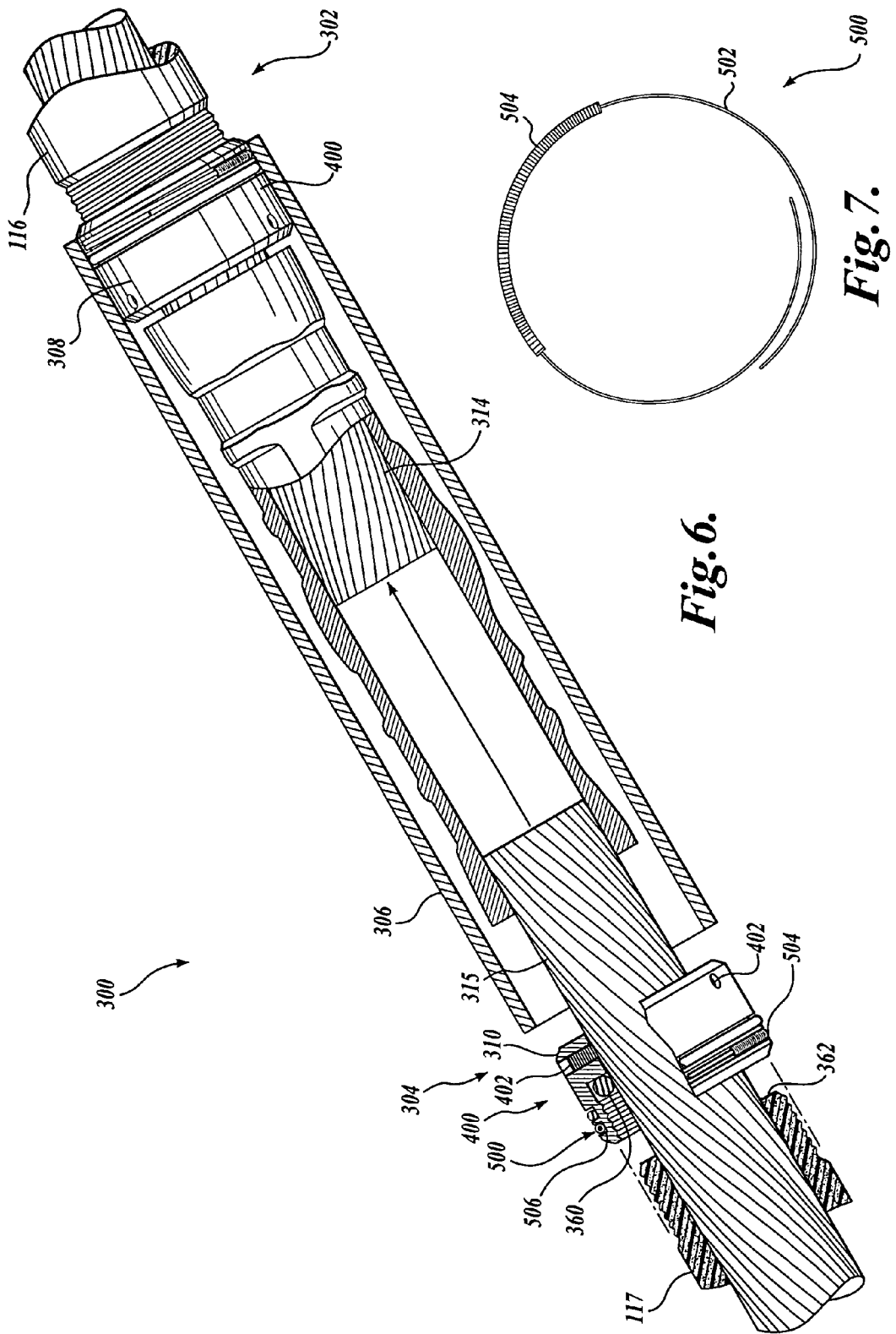
FIG. 6 is a partial cross-sectional and exploded elevational view of an alternate embodiment of a cable connection assembly formed in accordance with the present invention for coupling a first length of cable to a second length of cable of a cable assembly.
FIG. 7 is an elevation view of an electrical continuity connection assembly used with the cable connection assembly of FIG. 6.

Referring to FIG. 6, a partial cross-sectional and exploded elevational view of an alternate embodiment of a cable connection assembly 300 formed in accordance with the present invention for coupling a first length of cable 302 to a second length of cable 304 of a cable assembly is illustrated and described. The cable connection assembly 300 is substantially similar to the cable connection assembly 100 illustrated and described with respect to FIGS. 2-4. Therefore, for the sake of brevity, this detailed description will focus on the aspects of the cable connection assembly 300 which depart from that previously described. More specifically, the cable connection assembly 300 departs from the previously described embodiments in that the collars 308 and 310 of the cable connection assembly 300 each include a fastening assembly 400 for coupling the collars 308 and 310 directly to the conductors 314 and 315. Further, the each of the collars 308 and 310 include an electrical continuity connection assembly 500 for coupling the collars 308 and 310 in electrical continuity with the splice body 306.

Focusing on the fastening assembly 400 of each collar 308 and 310, the fastening assembly 400 includes one or more fasteners 402 for coupling the collar 308 or 310 directly to the conductor 114 or 115. In the illustrated embodiment, the fasteners 402 include one or more set screws equally spaced about a circumference of the collar 308 and 310 and radially oriented. Selectively rotating the set screws causes the set screws to move radially inward to engage and lock the collar 308 or 310 to the conductor 114 or 115. The fastening assembly 400 ensures a positive electrical connection between the collars 308 and 310 and the conductors 114 and 115. Additionally, the fastening assembly 400 retains the position of the collars 308 and 310 relative to the ends of the insulative conduits 116 and 117, thereby ensuring that the end seals 360 remain compressed and in a sealing relationship with the collars 308 and 310 and the end surfaces 362 of the insulative conduits 116 and 117.

As mentioned above, the electrical continuity connection assembly 500 may be used for coupling the collars 308 and 310 in electrical continuity with the sleeve 306. The electrical connection assembly 500 may include a retaining device 502 and an electrical connection device 504. The retaining device 502 in the illustrated embodiment is a snap ring formed from a piece of wire formed in a circular shape. The snap ring may be spread and placed about the collar 308 or 310 and preferably set within a channel 506 circumferentially disposed about the collar 308 or 310. Once placed in the channel 506, the snap ring attempts to conform to its original, non-spread shape, thereby retaining the snap ring within the channel 506.

Disposed about at least a portion of the retaining device 502 is the electrical connection device 504, which in the illustrated embodiment is a spring. The diameter of the spring may be selected such that when splice body 306 is installed over the collar 308 or 310, the spring is compressed against both the splice body 306 and the collar 308 or 310, ensuring an electrical connection between the two. Although the illustrated embodiment is illustrated and described with an electrical continuity connection assembly 500 which includes a snap ring and a spring, those skilled in the art will appreciate that the electrical continuity connection assembly 500 may take many other forms suitable for use with and which are within the scope of the present invention. For instance, the electrical continuity connection assembly 500 may include an endless circular spring which is stretched and released in the channel 506. The diameter of the spring may be selected such that when the splice body 306 is installed over the collar 308 or 310, the spring is compressed against both the splice body 306 and the collar 308 or 310, ensuring an electrical connection between the two. In another example, fasteners may be used to ensure an electrical connection between the two.

While the preferred embodiment of the invention has been illustrated and described, it will be appreciated that various changes can be made therein without departing from the spirit and scope of the invention.

The invention claimed is:

1. A cable connection assembly for coupling a cable to an apparatus, the cable connection assembly comprising:
   a collar adapted to sealingly engage the apparatus and the cable, the collar having a fastener formed on the collar that lockingly engages the cable by rotating the collar and fastener into threaded locking engagement with a threaded portion formed from an insulative layer manufactured onto the cable.

2. The cable connection assembly of claim 1, wherein the apparatus is a sleeve adapted to be sealingly coupled to another cable.

3. The cable connection assembly of claim 1, wherein the apparatus is a dead end seal.

4. The cable connection assembly of claim 1, wherein the threaded portion is formed from an insulative layer of the cable.

5. The cable connection assembly of claim 4, wherein the fastener includes an internally threaded portion formed within an inner passageway of the collar and adapted for cooperative locking engagement with the threaded portion of the cable.

6. The cable connection assembly of claim 1, further comprising an electrical continuity connection assembly for electrically coupling the cable to a sleeve.

7. The cable connection assembly of claim 6, wherein the electrical continuity connection assembly includes a compressible device adapted to be compressed and electrically couple the collar to the sleeve when the sleeve is sealingly engaged to the collar.

8. The cable connection assembly of claim 1, wherein the collar includes a fastening assembly for physically and electrically coupling the collar to a conductor of the cable.

9. A cable connection assembly for a cable comprising:
(a) a collar including a fastener formed on the collar, wherein the fastener is adapted to be coupled to the cable by rotation of the fastener relative to a threaded portion formed from an insulative layer manufactured onto the cable; and
(b) a sleeve adapted to sealingly engage the collar, thereby defining a cavity in which an end of the cable is adapted to be at least partially disposed within.

10. The cable connection assembly of claim 9, wherein the sleeve is adapted to be slidingly received on the collar.

11. The cable connection assembly of claim 9, wherein the collar is adapted to be slid entirely within the sleeve.

12. The cable connection assembly of claim 9, wherein the collar includes a recess for permitting the sleeve to be selectively deformed such that a portion of the sleeve extends into the recess to couple the sleeve to the collar.

13. The cable connection assembly of claim 9, wherein the fastener comprises internal threads.

14. The cable connection assembly of claim 9, wherein the collar includes a seal adapted to sealingly engage the sleeve and the collar.

15. The cable connection assembly of claim 14, wherein the collar includes an additional seal adapted to sealingly engage the cable and the collar.

16. The cable connection assembly of claim 9, further comprising an electrical continuity connection assembly for electrically coupling the cable to the sleeve.

17. The cable connection assembly of claim 16, wherein the electrical continuity connection assembly includes a compressible device adapted to be compressed and electrically couple the collar to the sleeve when the sleeve is sealingly engaged to the collar.

18. The cable connection assembly of claim 9, wherein the collar includes a fastening assembly for physically and electrically coupling the collar to a conductor of the cable.

19. A cable connection assembly for coupling a first conductor for carrying electrical current to a second conductor for carrying electrical current, the first conductor being insulated by a first insulative conduit having a first conduit fastener, the second conductor being insulated by a second insulative conduit having a second conduit fastener, the cable connection assembly comprising:
(a) a first collar comprising:
    (i) an outer surface;
    (ii) an inner surface defining a passageway passing axially through the first collar for permitting the first conductor to pass therethrough;
    (iii) a first collar fastener adapted to couple to the first conduit fastener by rotation of the first collar fastener relative to the first conduit fastener;
    (iv) a seal disposed on the outer surface;
(b) a second collar comprising:
    (i) an outer surface;
    (ii) an inner surface defining a passageway passing axially through the second collar for permitting the second conductor to pass therethrough;
    (iii) a second collar fastener adapted to couple to the second conduit fastener by rotation of the second collar fastener relative to the second conduit fastener;
    (iv) a seal disposed on the outer surface; and (c) a sleeve having a passageway passing therethrough, the passageway adapted to at least partially receive the first and second conductors, the sleeve adapted to sealingly engage the seal disposed on the outer surface of the first collar and the seal disposed on the outer surface of the second collar.

20. The cable connection assembly of claim 19, wherein the first and second collar fasteners comprise internal threads.

21. The cable connection assembly of claim 19, wherein the first collar includes an additional seal adapted to sealingly engage the first collar and the first insulative conduit.

22. The cable connection assembly of claim 19, further comprising an electrical continuity connection assembly having a compressible device for electrically coupling the first collar to the sleeve.

23. The cable connection assembly of claim 19, further comprising a fastening assembly for physically and electrically coupling the first collar to the first conductor.

24. A method of coupling a cable to an apparatus, the method comprising:
(a) rotating a collar having a fastener formed on the collar such that the fastener of the collar is rotated and the fastener lockingly engages a threaded portion formed from an insulative layer manufactured onto the cable; and
(b) sealingly coupling the apparatus to the collar.

25. The method of claim 24, further comprising sliding the apparatus into sealing engagement with the collar such that at least a portion of the collar is disposed within the apparatus.

26. The method of claim 24, coupling a second cable to a second collar and sealingly engaging the apparatus to the second collar.

27. The method of claim 24, wherein the apparatus is a dead end seal.

28. The method of claim 24, further comprising placing a seal in sealing engagement with the cable and the collar.

29. The method of claim 24, further comprising electrically coupling the cable to a sleeve using a compressible device placed between the collar and the sleeve.

30. The method of claim 24, further comprising using one or more fasteners to physically and electrically couple the collar to a conductor.

31. A method of coupling a cable to an apparatus, the method comprising:
(a) rotating a collar such that a fastener formed on the collar is rotated and the fastener lockingly engages a threaded portion formed from an insulative layer manufactured onto the cable;
(b) sealingly coupling the apparatus to the collar; and
(c) sliding the apparatus into sealing engagement with the collar such that at least a portion of the collar is disposed within the apparatus.

* * * * *

UNITED STATES PATENT AND TRADEMARK OFFICE
CERTIFICATE OF CORRECTION

PATENT NO. : 7,544,105 B2  Page 1 of 1
APPLICATION NO. : 11/210149
DATED : June 9, 2009
INVENTOR(S) : W. R. Stagi et al.

It is certified that error appears in the above-identified patent and that said Letters Patent is hereby corrected as shown below:

| COLUMN | LINE | ERROR |
|---|---|---|
| 10 (Claim 19, | 9 line 25) | after "surface; and" there should be a line break; "(c)" should begin a new subclause |

Signed and Sealed this

Twenty-fourth Day of November, 2009

David J. Kappos
*Director of the United States Patent and Trademark Office*